(12) United States Patent
Takamatsu et al.

(10) Patent No.: US 8,490,725 B2
(45) Date of Patent: Jul. 23, 2013

(54) MOTOR INSULATION PROTECTING DEVICE, AND VEHICLE HAVING THE DEVICE

(75) Inventors: Naoyoshi Takamatsu, Susono (JP); Daigo Kikuta, Aichi-gun (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 893 days.

(21) Appl. No.: 12/602,008

(22) PCT Filed: May 20, 2008

(86) PCT No.: PCT/JP2008/059614
§ 371 (c)(1),
(2), (4) Date: Nov. 25, 2009

(87) PCT Pub. No.: WO2008/146767
PCT Pub. Date: Dec. 4, 2008

(65) Prior Publication Data
US 2010/0187025 A1 Jul. 29, 2010

(30) Foreign Application Priority Data
May 28, 2007 (JP) ................................. 2007-140458

(51) Int. Cl.
*B60K 1/00* (2006.01)
(52) U.S. Cl.
USPC .............................. 180/65.1; 903/952; 310/88
(58) Field of Classification Search
USPC ................ 180/65.1, 65.285, 65.51; 903/906, 903/952; 310/196, 88, 63; 318/558
See application file for complete search history.

(56) References Cited

U.S. PATENT DOCUMENTS

| | | | | |
|---|---|---|---|---|
| 5,793,132 A | * | 8/1998 | Hirose et al. | ..................... 310/71 |
| 6,178,905 B1 | * | 1/2001 | Dynes et al. | ............... 114/55.54 |

FOREIGN PATENT DOCUMENTS

| | | |
|---|---|---|
| JP | 4-185533 A | 7/1992 |
| JP | 2005-153724 A | 6/2005 |
| JP | 2006-288170 A | 10/2006 |

OTHER PUBLICATIONS

Chinese Office Action issued Oct. 17, 2011 for Chinese Application No. 200880015965.0.
Notice of Allowance for related U.S. Appl. No. 12/601,753 mailed Apr. 2, 2013.

* cited by examiner

*Primary Examiner* — John Walters
(74) *Attorney, Agent, or Firm* — Sughrue Mion, PLLC

(57) ABSTRACT

There is provided a motor insulation protecting device 200 comprising a motor 40 installed in a motor chamber 14; an inverter 16 that supplies an inverter voltage for driving the motor 40; and pressurizing means for monitoring an internal pressure in the motor chamber 14 and the inverter voltage of the inverter 16, and increasing the pressure in the motor chamber when an occurrence of discharge of the motor is predicted, wherein the pressurizing means comprises a pressure detection unit 50 that detects the internal pressure in the motor chamber 14; a voltage detection unit that is provided in a control unit 60, and detects the inverter voltage of the inverter 16; and a pressurizing mechanism 70 that increases the pressure in the motor chamber 14 in accordance with the output from the control unit 60 when the detected internal pressure is lower than a preset discharge occurrence prediction internal pressure, and the detected inverter voltage is higher than a preset discharge occurrence prediction inverter voltage.

18 Claims, 6 Drawing Sheets

MOTOR INSULATION PROTECTING DEVICE, AND VEHICLE HAVING THE DEVICE

TECHNICAL FIELD

The present invention relates to a motor insulation protecting device and a vehicle having the device, and in particular, to a motor insulation protecting device that prevents motor insulation deterioration caused by motor discharge under conditions that are below atmospheric pressure, and a vehicle having the device.

BACKGROUND ART

An insulation treatment is applied to a motor typically mounted in hybrid electric vehicles having a generator that generates electric power based on engine driving or regeneration, and a motor that operates using power supplied from a battery to drive driving wheels, or electric vehicles including such hybrid vehicles.

However, because a motor driven in hybrid electric vehicles or electric vehicles as described above has a higher voltage than a typical motor, and is at, for example, 500 V, when the hybrid electric vehicles or electric vehicles travel in, for example, a high-altitude area (for example, at high elevations above 4000 m), the pressure near the motor decreases, resulting in a situation where electronic discharge tends to occur in the air, and an insulation treatment film applied to the motor may deteriorate to cause insulation defects. Further, an inverter-driven motor may transiently have non-uniform voltage sharing, which concentrates voltage at a first coil that is closest to the inverter, and discharge may tend to occur.

Heretofore, there have been proposed devices that prevent entrance of water or dust resulting from a situation where a wheel motor of an electric vehicle has an internal pressure lower than an external air pressure. For example, Japanese Patent Publication No. JP 2005-153724 A proposes a system having a flood sensing means for sensing flooding of a motor for the purpose of water proofing, wherein the inside of the motor is pressurized in accordance with the output of the flood sensing means, and Japanese Patent Publication No. JP 4-185533 A proposes a structure wherein compressed air is supplied into a wheel motor from an air tank mounted in a vehicle so that a wheel motor internal pressure is made higher than an external air pressure by 0.02 MPa or more.

However, even if the inside of the motor is pressurized at the time of flooding, or a wheel motor internal pressure is made higher than an external air pressure by 0.02 MPa or more, the wheel motor internal pressure may be at one atmospheric pressure (0.1 MPa) or less when the vehicle travels in a high-altitude area, and in such cases, discharge may still occur, and a motor insulation treatment film may deteriorate.

DISCLOSURE OF INVENTION

The present invention was made in consideration of the foregoing problems, and an object of the present invention is to provide a motor insulation protecting device that adjusts the motor internal pressure to a pressure at which discharge does not occur to prevent motor insulation deterioration even when the vehicle travels in a high-altitude area, and a vehicle having the device.

In order to achieve the above-described object, a motor insulation protecting device and a vehicle having the device according to the present invention have the following features.

(1) According to one aspect of the present invention, there is provided a motor insulation protecting device, comprising a motor installed in a motor chamber; and pressurizing means for monitoring an internal pressure in the motor chamber, and increasing the pressure in the motor chamber when an occurrence of discharge of the motor is predicted.

Because the internal pressure in the motor chamber is monitored, and the pressure in the motor chamber is increased only when an occurrence of discharge of the motor is predicted, it is possible to prevent motor insulation defects, while reducing energy loss, and without allowing the internal pressure in the motor chamber to decrease to a pressure at which discharge occurs even when the atmospheric pressure drops, for example, in a high-altitude area.

(2) According to another aspect of the present invention, in the motor insulation protecting device described above under (1), the pressurizing means comprises a pressure detection unit that detects an internal pressure in the motor chamber; and a pressurizing unit that increases the pressure in the motor chamber when the detected internal pressure is lower than a preset discharge occurrence prediction internal pressure.

By increasing the pressure in the motor chamber when the detected internal pressure is lower than a preset discharge occurrence prediction internal pressure, it is possible to increase the value of the voltage from which discharge of the motor starts. Thus, it is possible to inhibit discharge, and prevent motor insulation defects.

(3) According to still another aspect of the present invention, in the motor insulation protecting device described above under (2), the pressurizing unit comprises a comparison unit that compares the detected internal pressure and the preset discharge occurrence prediction internal pressure; and a pressurizing mechanism that increases the pressure in the motor chamber in accordance with an output from the comparison unit.

With the above-described structure, the pressure in the motor chamber can be increased only when an occurrence of discharge of the motor is predicted, and energy loss can be reduced.

(4) According to still another aspect of the present invention, there is provided a motor insulation protecting device, comprising a motor installed in a motor chamber; and pressure controlling means for controlling a pressure in the motor chamber based on a voltage applied to the motor.

(5) According to still another aspect of the present invention, there is provided a motor insulation protecting device, comprising a motor installed in a motor chamber; an inverter that supplies an inverter voltage for driving the motor; and pressurizing means for monitoring the inverter voltage, and increasing a pressure in the motor chamber when an occurrence of discharge of the motor is predicted.

Because the inverter voltage of the inverter is monitored, and the pressure in the motor chamber is increased only when an occurrence of discharge of the motor is predicted, it is possible to prevent motor insulation defects, while reducing energy loss, and without allowing the internal pressure in the motor chamber to decrease to a pressure at which discharge occurs even when the atmospheric pressure drops, for example, in a high-altitude area.

(6) According to still another aspect of the present invention, in the motor insulation protecting device described above under (5), the pressurizing means comprises a voltage detection unit that detects the inverter voltage of the inverter; and a pressurizing unit that increases the pressure in the motor chamber when the detected inverter voltage is higher than a preset discharge occurrence prediction inverter voltage.

When the detected inverter voltage is higher than a preset discharge occurrence prediction inverter voltage, the coil voltage in the motor increases, and it may become a state in which discharge tends to occur when the motor chamber internal pressure is low. With this being the situation, by increasing the pressure in the motor chamber, and increasing the value of the (coil) voltage from which discharge of the motor starts, it is possible to inhibit discharge, and prevent motor insulation defects.

(7) According to still another aspect of the present invention, in the motor insulation protecting device described above under (6), the pressurizing unit comprises a comparison unit that compares the detected inverter voltage and the preset discharge occurrence prediction inverter voltage; and a pressurizing mechanism that increases the pressure in the motor chamber in accordance with an output from the comparison unit.

With the above-described structure, the pressure in the motor chamber can be increased only when an occurrence of discharge of the motor is predicted, and energy loss can be reduced.

(8) According to still another aspect of the present invention, there is provided a motor insulation protecting device, comprising a motor installed in a motor chamber; an inverter that supplies an inverter voltage for driving the motor; and pressurizing means for monitoring an internal pressure in the motor chamber and the inverter voltage of the inverter, and increasing the pressure in the motor chamber when an occurrence of discharge of the motor is predicted.

For example, even if the internal pressure in the motor chamber is low, when the inverter voltage is low, it becomes less likely for discharge to occur because the coil voltage of the motor is also low. Therefore, by monitoring both the internal pressure in the motor chamber and the inverter voltage of the inverter, the accuracy of prediction of an occurrence of discharge of the motor is further improved. Further, because the pressure in the motor chamber is increased only when an occurrence of discharge is predicted, it is possible to prevent motor insulation defects, while minimizing energy loss, and without allowing the internal pressure in the motor chamber to decrease to a pressure at which discharge occurs even when the atmospheric pressure drops, for example, in a high-altitude area.

(9) According to still another aspect of the present invention, in the motor insulation protecting device described above under (8), the pressurizing means comprises a pressure detection unit that detects the internal pressure in the motor chamber; a voltage detection unit that detects the inverter voltage of the inverter; and a pressurizing unit that increases the pressure in the motor chamber when the detected internal pressure is lower than a preset discharge occurrence prediction internal pressure, and the detected inverter voltage is higher than a preset discharge occurrence prediction inverter voltage.

Because the possibility of an occurrence of discharge in the motor is high when the detected internal pressure is lower than a preset discharge occurrence prediction internal pressure, and the detected inverter voltage is higher than a preset discharge occurrence prediction inverter voltage, by increasing the pressure in the motor chamber only when these conditions are met, it is possible to increase the value of the (coil) voltage from which discharge of the motor starts, while reducing energy loss, to thereby inhibit discharge, and prevent motor insulation defects.

(10) According to still another aspect of the present invention, in the motor insulation protecting device described above under (9), the pressurizing unit comprises a pressure comparison unit that compares the detected internal pressure and the preset discharge occurrence prediction internal pressure; a voltage comparison unit that compares the detected inverter voltage and the preset discharge occurrence prediction inverter voltage; and a pressurizing mechanism that increases the pressure in the motor chamber in accordance with outputs from the pressure comparison unit and the voltage comparison unit.

With the above-described structure, the pressure in the motor chamber can be increased only when an occurrence of discharge of the motor is predicted, and energy loss can be minimized.

(11) According to still another aspect of the present invention, in the motor insulation protecting device described above under anyone of (1) to (10), the motor chamber is further provided with a safety valve.

By opening the safety valve when the internal pressure in the motor chamber becomes abnormal, the motor chamber internal pressure can be maintained at an adequate level.

(12) According to still another aspect of the present invention, there is provided a vehicle comprising the motor insulation protecting device described above under any one of (1) to (11).

It is possible to provide a vehicle in which a motor that inhibits motor insulation deterioration, and has excellent durability, is mounted.

BEST MODE FOR CARRYING OUT THE INVENTION

Embodiments of the present invention will be described below with reference to the drawings.

Figure 1:
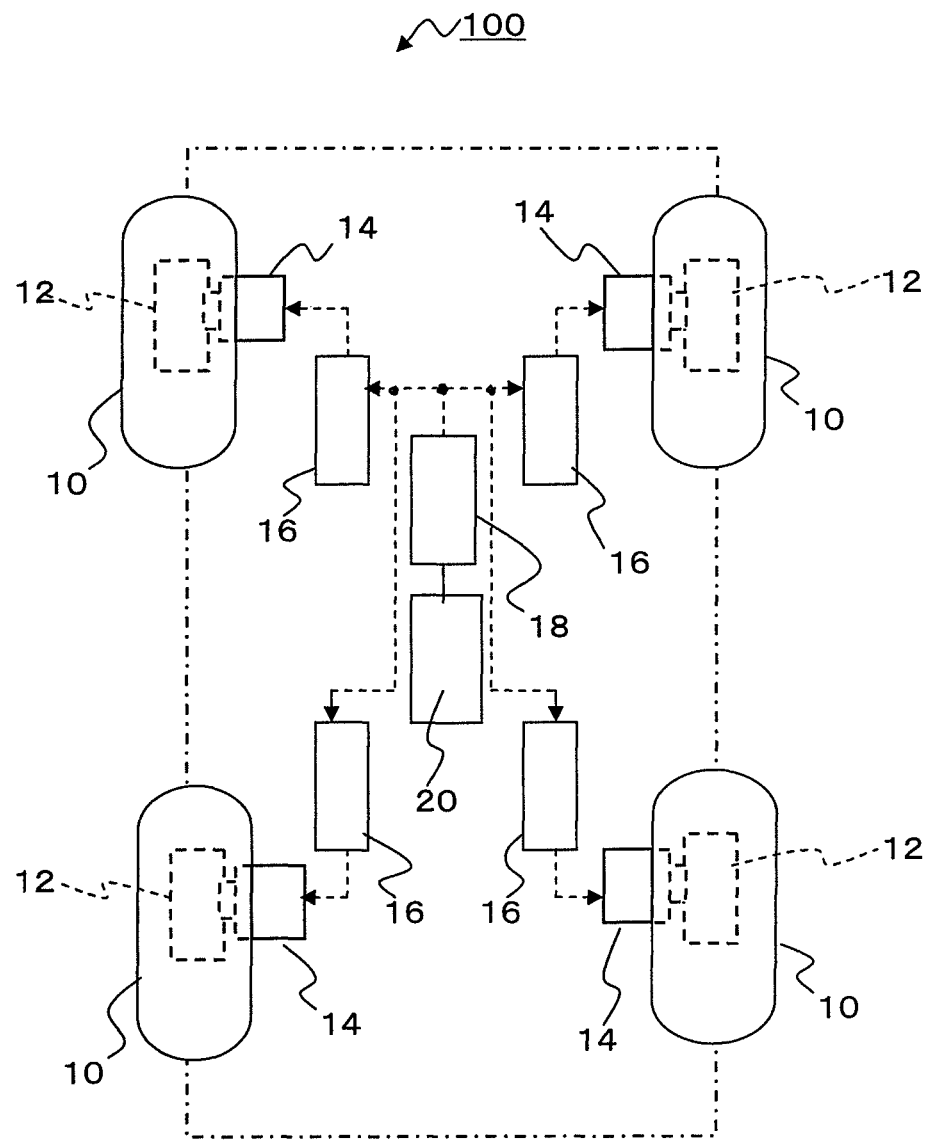
FIG. 1 is a structure diagram illustrating an example of a schematic structure of a vehicle in which a motor insulation protecting device according to the present invention is mounted.

FIG. 1 shows an example of a structure of a hybrid electric vehicle or an electric vehicle according to an embodiment of the present invention. As shown in FIG. 1, a body 100 of a hybrid electric vehicle or an electric vehicle is provided with a plurality of travelling wheels 10, a plurality of motor chambers 14 in which motors for individually driving the respective travelling wheels 10 to rotate are installed, a generator 18 that supplies power to the motors installed in the plurality of motor chambers 14, an engine 20 that drives the generator 18, and inverters 16 that change the frequency of alternating-current power supplied from the generator 18 and supply it to the motors installed in the motor chambers 14. In addition, brake-equipped reduction gears 12 are each connected to apart of a shaft of the motors installed in the motor chambers 14, and the rotation of the shafts of the motors is decelerated by the brake-equipped reduction gears 12 and is transmitted to the travelling wheels 10.

A motor insulation protecting device according to the present embodiment, which is to be mounted in a hybrid electric vehicle or an electric vehicle, will be described below with reference to FIG. 2 through FIG. 6.

Figure 2:
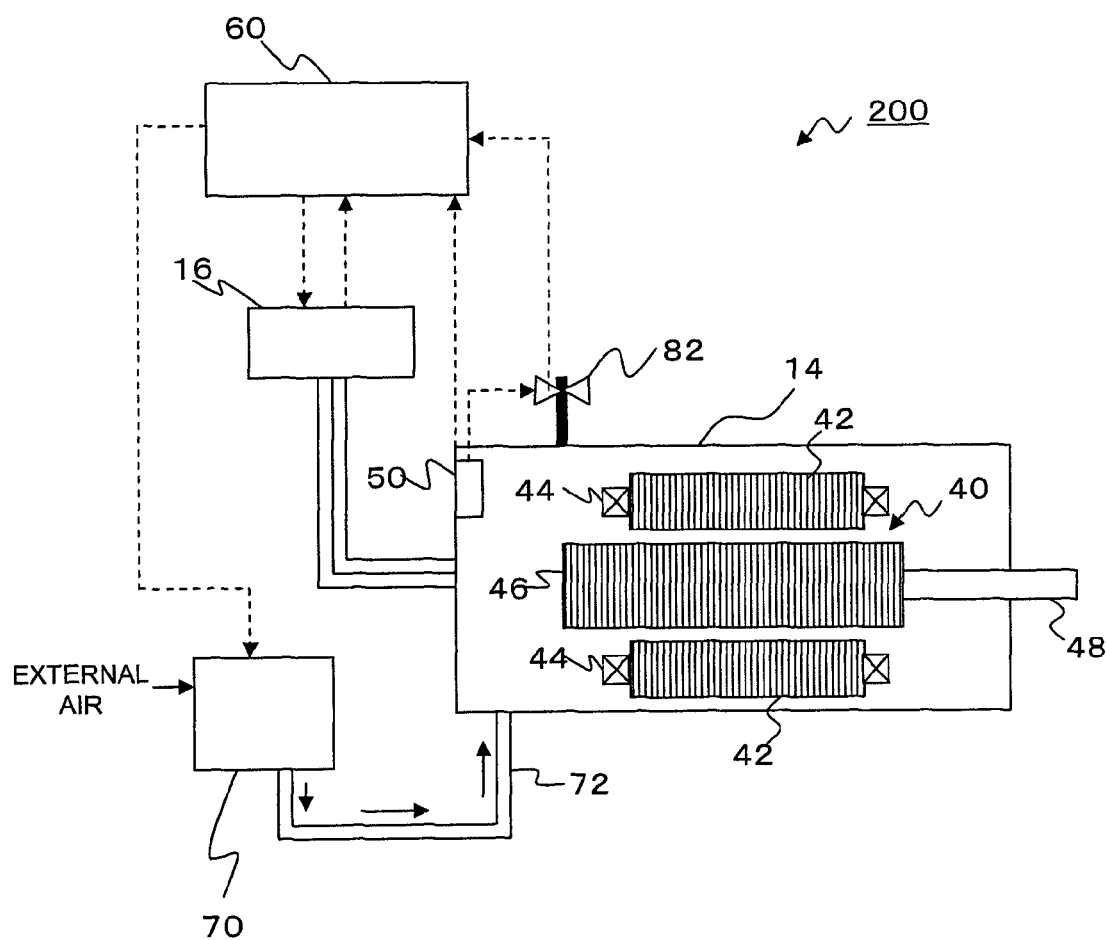
FIG. 2 is a structure diagram showing a schematic structure of a motor insulation protecting device according to an embodiment of the present invention.

As shown in FIG. 2, in a motor insulation protecting device 200 according to the present embodiment, an axle shaft 48 for driving a travelling wheel 10 as shown in FIG. 1 is provided piercing through the motor 40 of the motor chamber 14 having a hermetic structure, a rotor 46 is attached to the axle shaft 48, and on the other hand, stators 42 and coils 44 are formed so as to face the rotor 46. Here, to provide a hermetic seal for the motor chamber 14, for example, an oil seal is formed in a gap between the rotor 46 of the motor 40 or the axle shaft 48 of the motor 40 and a bearing. The oil seal comprises three parts: a synthetic rubber, a metal ring, and a spring.

Further, the motor insulation protecting device 200 according to the present embodiment has, as pressurizing means, a pressure detection unit 50 that detects a chamber internal pressure of the motor chamber 14, a voltage detection unit that detects an inverter voltage of the inverter 16, and a pressurizing unit that increases the chamber internal pressure of the motor chamber 14 in accordance with the output from the pressure detection unit 50 and/or the voltage detection unit. Here, the pressure detection unit 50 may employ, for example, a pressure sensor. Further, the voltage detection unit is provided within a control unit 60, which will be described later.

Further, as shown in FIG. 2, the pressurizing unit has a pressurizing mechanism 70, and the control unit 60 that controls an amount of compressed air supplied from the pressurizing mechanism 70 which is introduced into the motor chamber 14 in accordance with the output from the pressure detection unit 50. Here, the pressurizing mechanism 70 may employ, for example, a compressor serving as an air introducing device, and the pressurizing mechanism 70 and the motor chamber 14 are connected through a pipe 72. It should be noted that the pipe 72 may be provided with a pressure valve that opens and closes in accordance with the output from the control unit 60. Further, as shown in FIG. 2, the motor chamber 14 is provided with a safety valve 82 that can release the internal pressure when the chamber internal pressure becomes abnormal. It should be noted that although, in the present embodiment, a safety valve is provided for the motor chamber 14, it may be provided for the pipe 72.

Further, the inverter voltage supplied from the inverter 16 to the motor 40 is controlled in response to a drive signal supplied from the control unit 60, and on the other hand, a signal based on a value of the inverter voltage supplied from the inverter 16 is transmitted to the control unit 60 so that the control unit 60 will recognize the value of the inverter voltage supplied to the motor 40.

The control unit 60 is further provided with a set value storage unit in which a "discharge occurrence prediction internal pressure" (hereinafter also referred to as "set motor chamber internal pressure") for comparison with a detected internal pressure and a "discharge occurrence prediction inverter voltage" (hereinafter also referred to as "set inverter voltage") for comparison with a detected inverter voltage are preset and stored, and a comparison unit having a pressure comparison unit that compares a detected internal pressure and a preset discharge occurrence prediction internal pressure, and a voltage comparison unit that compares a detected inverter voltage and a preset discharge occurrence prediction inverter voltage.

Further, the inverter voltage is to be set in accordance with the travel speed of a vehicle, and the control unit 60 may also recognize, other than an actual inverter voltage V, an inverter voltage Vs which is preset in accordance with the travel speed.

Figure 3:
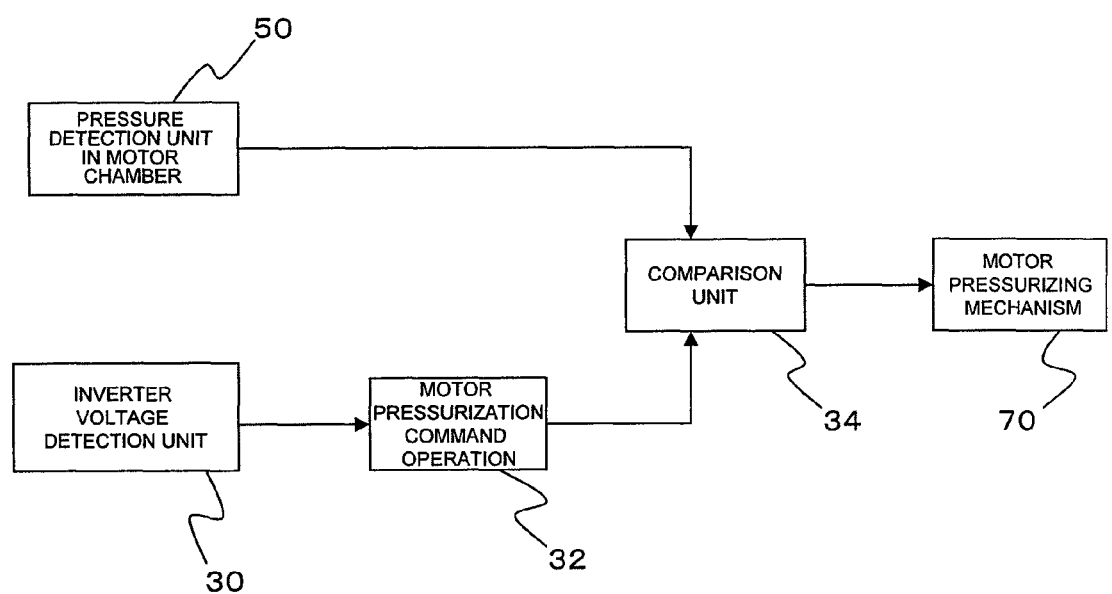
FIG. 3 is a control block diagram of a motor insulation protecting device according to an embodiment of the present invention.

Then, the motor insulation protecting device 200 according to the present embodiment inhibits discharge by increasing the motor chamber internal pressure, as further shown in FIG. 3, in accordance with three embodiments. The three embodiments will be described below with reference to FIG. 3 through FIG. 6.

First Embodiment

According to a first embodiment of the present invention, a motor insulation protecting device that predicts an occurrence of discharge of the motor based on an internal pressure in the motor chamber 14 to increase the pressure in the motor chamber 14, will be described. As shown in FIG. 3, the pressure detection unit 50 in the motor chamber detects an internal pressure in the motor chamber 14, a comparison unit 34 in the control unit 60 compares the detected internal pressure and the preset discharge occurrence prediction internal pressure, and the pressurizing mechanism 70 for the motor is used to increase the pressure in the motor chamber when the detected internal pressure is lower than the preset discharge occurrence prediction internal pressure.

Figure 4:
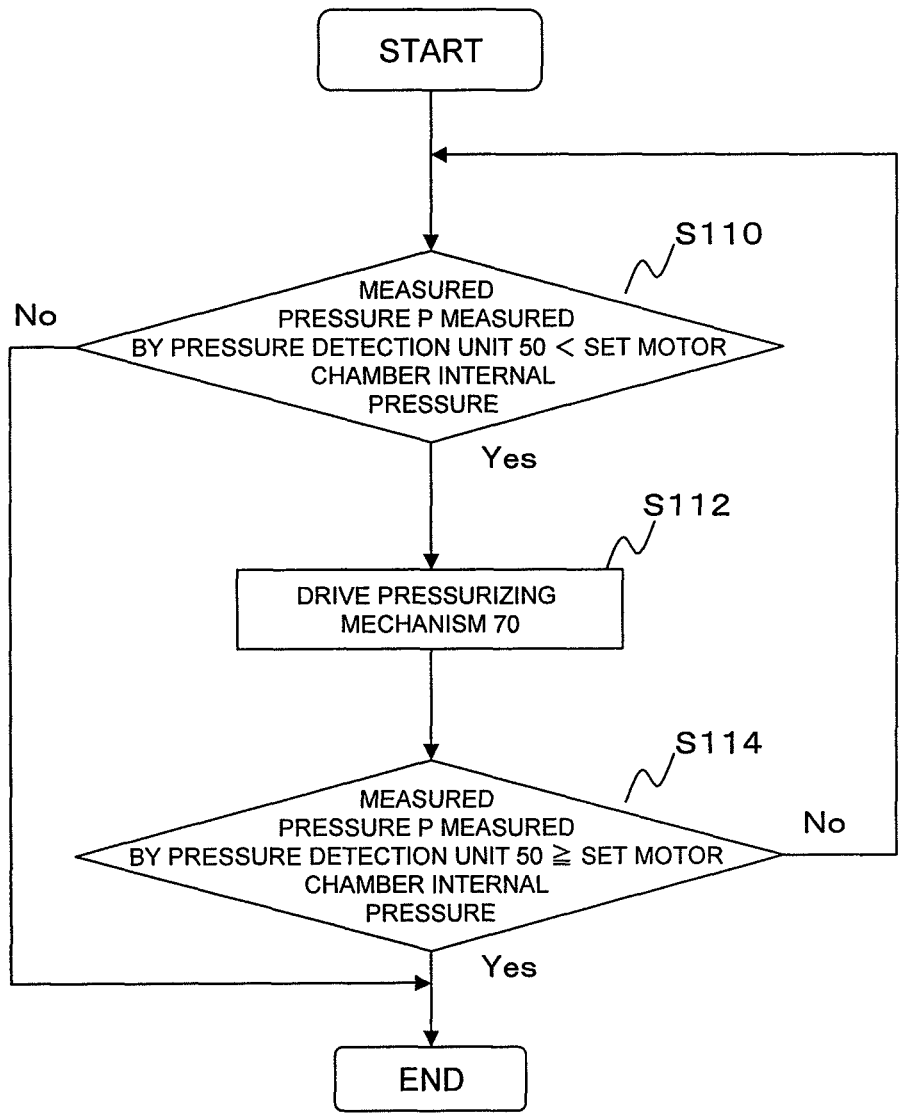
FIG. 4 is a flowchart illustrating an operation of pressurization control of a motor insulation protecting device according to a first embodiment of the present invention.

Further, an example of the operation will be described with reference to FIG. 4, in which when the control unit 60 determines that a measured pressure P measured by the pressure detection unit 50 which is input is lower than the set motor chamber internal pressure (in other words, "preset discharge occurrence prediction internal pressure") (S110), the control unit 60 drives the pressurizing mechanism 70 to supply compressed air into the motor chamber 14 (S112). After that, the control unit 60 suspends the driving of the pressurizing mechanism 70 when a measured pressure P measured by the pressure detection unit 50 which is input becomes equal to or greater than the set motor chamber internal pressure (S114). Thus, it is possible to maintain the inside of the motor chamber 14 at a motor chamber internal pressure at which discharge does not occur.

On the other hand, if the pressure detection unit 50 detects that the chamber internal pressure of the motor chamber 14 becomes a pressure higher than the seal strength of the motor chamber, the safety valve 82 shown in FIG. 2 is opened to release some of the internal gas of the motor chamber 14 to the outside. The open operation of the safety valve 82 is transmitted to the control unit 60, and the safety valve 82 is closed after a predetermined chamber internal pressure is reached. Thus, the motor chamber internal pressure can be adjusted to an adequate chamber internal pressure at which discharge does not occur.

Second Embodiment

According to a second embodiment of the present invention, an embodiment in which the pressure in the motor chamber is controlled based on a voltage applied to the motor will be described. Here, as an example of the embodiment in which the pressure is controlled, for example, increased, based on the applied voltage, a motor insulation protecting device that predicts an occurrence of discharge of the motor based on, for example, an inverter voltage of the inverter 16 to increase the pressure in the motor chamber will be described. As shown in FIG. 3, the inverter voltage detection unit 30 in the control unit 60 detects an inverter voltage V of the inverter 16, the comparison unit 34 in the control unit 60 compares the detected inverter voltage V and the preset discharge occurrence prediction inverter voltage, and the pressurizing mechanism 70 for the motor is used to increase the pressure in the motor chamber when the detected inverter voltage V is higher than the preset discharge occurrence prediction inverter voltage.

It should be noted that although, in FIG. 3, the inverter voltage V of the inverter 16 is directly detected and compared by the comparison unit 34, the present invention is not limited to this embodiment. For example, an inverter voltage Vs for control may be set in accordance with the travel speed of a vehicle and stored in the control unit 60 in the form of a map beforehand. It is therefore also possible to obtain a current inverter voltage Vs for control based on the travel-speed-versus-inverter-voltage-Vs-for-control map stored in the control unit 60 from an actual travel speed of a vehicle, to compare the thus-obtained inverter voltage Vs and the preset discharge occurrence prediction inverter voltage, and to increase the pressure in the motor chamber using the pressurizing mechanism 70 for the motor when the detected inverter voltage Vs is higher than the preset discharge occurrence prediction inverter voltage.

Figure 5:
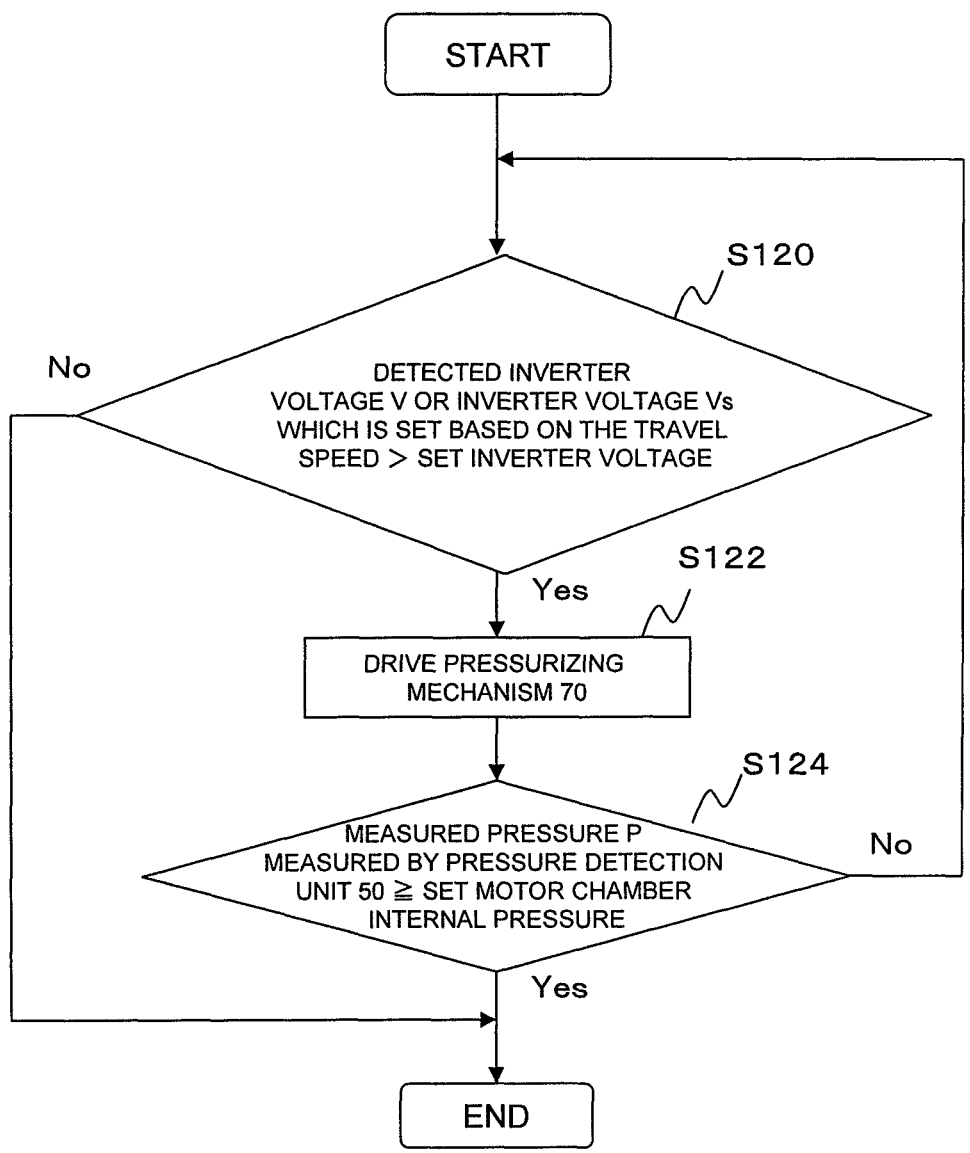
FIG. 5 is a flowchart illustrating an operation of pressurization control of a motor insulation protecting device according to a second embodiment of the present invention.

Further, an example of the operation will be described with reference to FIG. 5, in which, when the control unit 60 determines that either the detected inverter voltage V or the inverter voltage Vs which is set based on the travel speed as described above is higher than the set inverter voltage (in other words, "preset discharge occurrence prediction inverter voltage") (S120), the control unit 60 drives the pressurizing mechanism 70 to supply compressed air into the motor chamber 14 (S122). After that, the control unit 60 suspends the driving of the pressurizing mechanism 70 when a measured pressure P measured by the pressure detection unit 50 which is input becomes equal to or greater than the set motor chamber internal pressure (S124). Thus, it is possible to maintain the inside of the motor chamber 14 at a motor chamber internal pressure at which discharge does not occur.

On the other hand, if the pressure detection unit 50 detects that the chamber internal pressure of the motor chamber 14 becomes a pressure higher than the seal strength of the motor chamber, as in the first embodiment, the safety valve 82 shown in FIG. 2 is opened to release some of the internal gas of the motor chamber 14 to the outside. The open operation of the safety valve 82 is transmitted to the control unit 60, and the safety valve 82 is closed after a predetermined chamber internal pressure is reached. Thus, the motor chamber internal pressure can be adjusted to an adequate chamber internal pressure at which discharge does not occur.

Third Embodiment

According to a third embodiment of the present invention, a motor insulation protecting device that predicts an occurrence of discharge of the motor based on the internal pressure in the motor chamber 14 and the inverter voltage of the inverter 16 to increase the pressure in the motor chamber will be described. As shown in FIG. 3, the pressure detection unit 50 in the motor chamber 14 detects the internal pressure in the motor chamber 14, and the comparison unit 34 in the control unit 60 compares the detected internal pressure and the preset discharge occurrence prediction internal pressure, while the inverter voltage detection unit 30 in the control unit 60 detects the inverter voltage V of the inverter 16, and the comparison unit 34 in the control unit 60 compares either the detected inverter voltage V or the inverter voltage Vs which is set based on the travel speed with the preset discharge occurrence prediction inverter voltage. The pressurizing mechanism 70 for the motor is used to increase the pressure in the motor chamber when the comparison unit 34 determines that the detected internal pressure is lower than the preset discharge occurrence prediction internal pressure, and that the detected inverter voltage V is higher than the preset discharge occurrence prediction inverter voltage.

Figure 6:
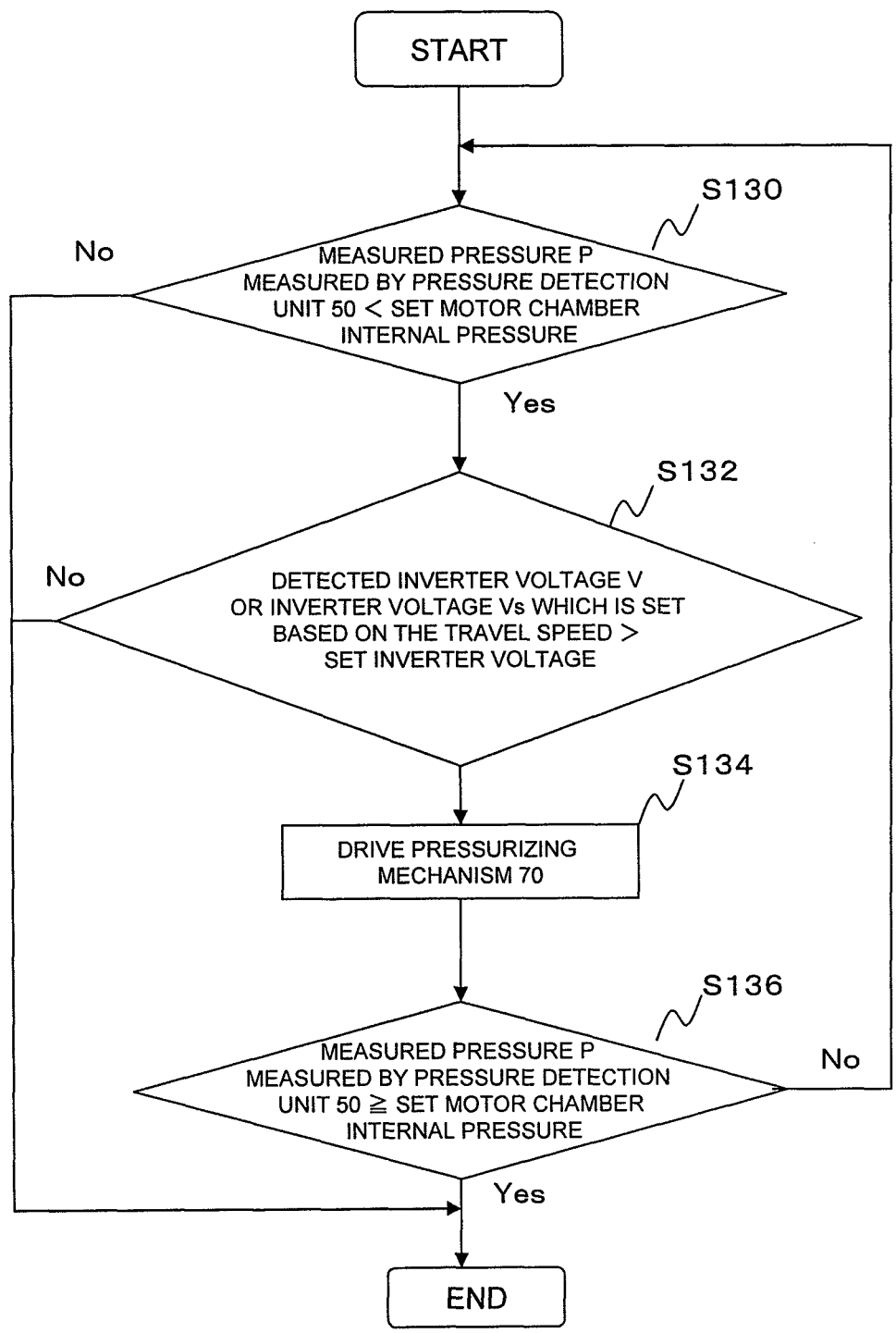
FIG. 6 is a flowchart illustrating an operation of pressurization control of a motor insulation protecting device according to a third embodiment of the present invention.

Further, an example of the operation will be described with reference to FIG. 6, in which, when the control unit 60 determines that the measured pressure P measured by the pressure detection unit 50 which is input is lower than the set motor chamber internal pressure (in other words, "preset discharge occurrence prediction internal pressure") (S130), the control unit 60 further compares either the detected inverter voltage V or the inverter voltage Vs which is set based on the travel speed and the preset discharge occurrence prediction inverter voltage, and when either the detected inverter voltage V or the inverter voltage Vs which is set based on the travel speed as described above is higher than the set inverter voltage (in other words, "preset discharge occurrence prediction inverter voltage") (S132), the control unit 60 drives the pressurizing mechanism 70 to supply compressed air into the motor chamber 14 (S134). After that, the control unit 60 suspends the driving of the pressurizing mechanism 70 when the measured pressure P measured by the pressure detection unit 50 which is input becomes equal to or greater than the set motor chamber internal pressure (S136). Thus, it is possible to maintain the inside of the motor chamber 14 at a motor chamber internal pressure at which discharge does not occur.

On the other hand, if the pressure detection unit 50 detects that the chamber internal pressure of the motor chamber 14 becomes a pressure higher than the seal strength of the motor chamber, the safety valve 82 shown in FIG. 2 is opened to release some of the internal gas of the motor chamber 14 to the outside. The open operation of the safety valve 82 is transmitted to the control unit 60, and the safety valve 82 is closed after a predetermined chamber internal pressure is reached. Thus, the motor chamber internal pressure can be adjusted to an adequate chamber internal pressure at which discharge does not occur.

According to the present invention, it is possible to provide a motor that prevents motor insulation deterioration, and has excellent durability, and a vehicle in which such a motor is mounted.

It should be noted that, although the present invention has been described in detail, the scope of the present invention is not limited to the embodiments described above.

Further, the disclosure of Japanese Patent Application No. 2007-140458 filed on May 28, 2007, including the specification, claims, drawings, and abstract is incorporated herein by reference in its entirety.

INDUSTRIAL APPLICABILITY

The motor insulation protecting device according to the present invention is useful for a motor which is mounted in a hybrid electric vehicle or an electric vehicle, and is also suitable for application to a motor which is used under high-voltage and low-pressure environments.

The invention claimed is:

1. A motor insulation protecting device, comprising a motor installed in a motor chamber; and pressurizing means for monitoring an internal pressure in the motor chamber, and increasing the pressure in the motor chamber when an occurrence of discharge of the motor is predicted.

2. The motor insulation protecting device according to claim 1, wherein the pressurizing means comprises a pressure detection unit that detects an internal pressure in the motor chamber; and a pressurizing unit that increases the pressure in the motor chamber when the detected internal pressure is lower than a preset discharge occurrence prediction internal pressure.

3. The motor insulation protecting device according to claim 2, wherein the pressurizing unit comprises a comparison unit that compares the detected internal pressure and the preset discharge occurrence prediction internal pressure; and a pressurizing mechanism that increases the pressure in the motor chamber in accordance with an output from the comparison unit.

4. The motor insulation protecting device according to claim 1, wherein the motor chamber is further provided with a safety valve.

5. A vehicle comprising the motor insulation protecting device according to claim 1.

6. A motor insulation protecting device, comprising a motor installed in a motor chamber; and pressure controlling means for controlling a pressure in the motor chamber based on a voltage applied to the motor.

7. The motor insulation protecting device according to claim 6, wherein the motor chamber is further provided with a safety valve.

8. A vehicle comprising the motor insulation protecting device according to claim 6.

9. A motor insulation protecting device, comprising a motor installed in a motor chamber; an inverter that supplies an inverter voltage for driving the motor; and pressurizing means for monitoring the inverter voltage, and increasing a pressure in the motor chamber when an occurrence of discharge of the motor is predicted.

10. The motor insulation protecting device according to claim 9, wherein the pressurizing means comprises a voltage detection unit that detects the inverter voltage of the inverter; and a pressurizing unit that increases the pressure in the motor chamber when the detected inverter voltage is higher than a preset discharge occurrence prediction inverter voltage.

11. The motor insulation protecting device according to claim 10, wherein the pressurizing unit comprises a comparison unit that compares the detected inverter voltage and the preset discharge occurrence prediction inverter voltage; and a pressurizing mechanism that increases the pressure in the motor chamber in accordance with an output from the comparison unit.

12. The motor insulation protecting device according to claim 9, wherein the motor chamber is further provided with a safety valve.

13. A vehicle comprising the motor insulation protecting device according to claim 9.

14. A motor insulation protecting device, comprising a motor installed in a motor chamber; an inverter that supplies an inverter voltage for driving the motor; and pressurizing means for monitoring an internal pressure in the motor chamber and the inverter voltage of the inverter, and increasing the pressure in the motor chamber when an occurrence of discharge of the motor is predicted.

15. The motor insulation protecting device according to claim 14, wherein the pressurizing means comprises a pressure detection unit that detects the internal pressure in the motor chamber; a voltage detection unit that detects the inverter voltage of the inverter; and a pressurizing unit that increases the pressure in the motor chamber when the detected internal pressure is lower than a preset discharge occurrence prediction internal pressure, and the detected inverter voltage is higher than a preset discharge occurrence prediction inverter voltage.

16. The motor insulation protecting device according to claim 15, wherein the pressurizing unit comprises a pressure comparison unit that compares the detected internal pressure and the preset discharge occurrence prediction internal pressure; a voltage comparison unit that compares the detected inverter voltage and the preset discharge occurrence prediction inverter voltage; and a pressurizing mechanism that increases the pressure in the motor chamber in accordance with outputs from the pressure comparison unit and the voltage comparison unit.

17. The motor insulation protecting device according to claim 14, wherein the motor chamber is further provided with a safety valve.

18. A vehicle comprising the motor insulation protecting device according to claim 14.

* * * * *